Patented June 2, 1925.

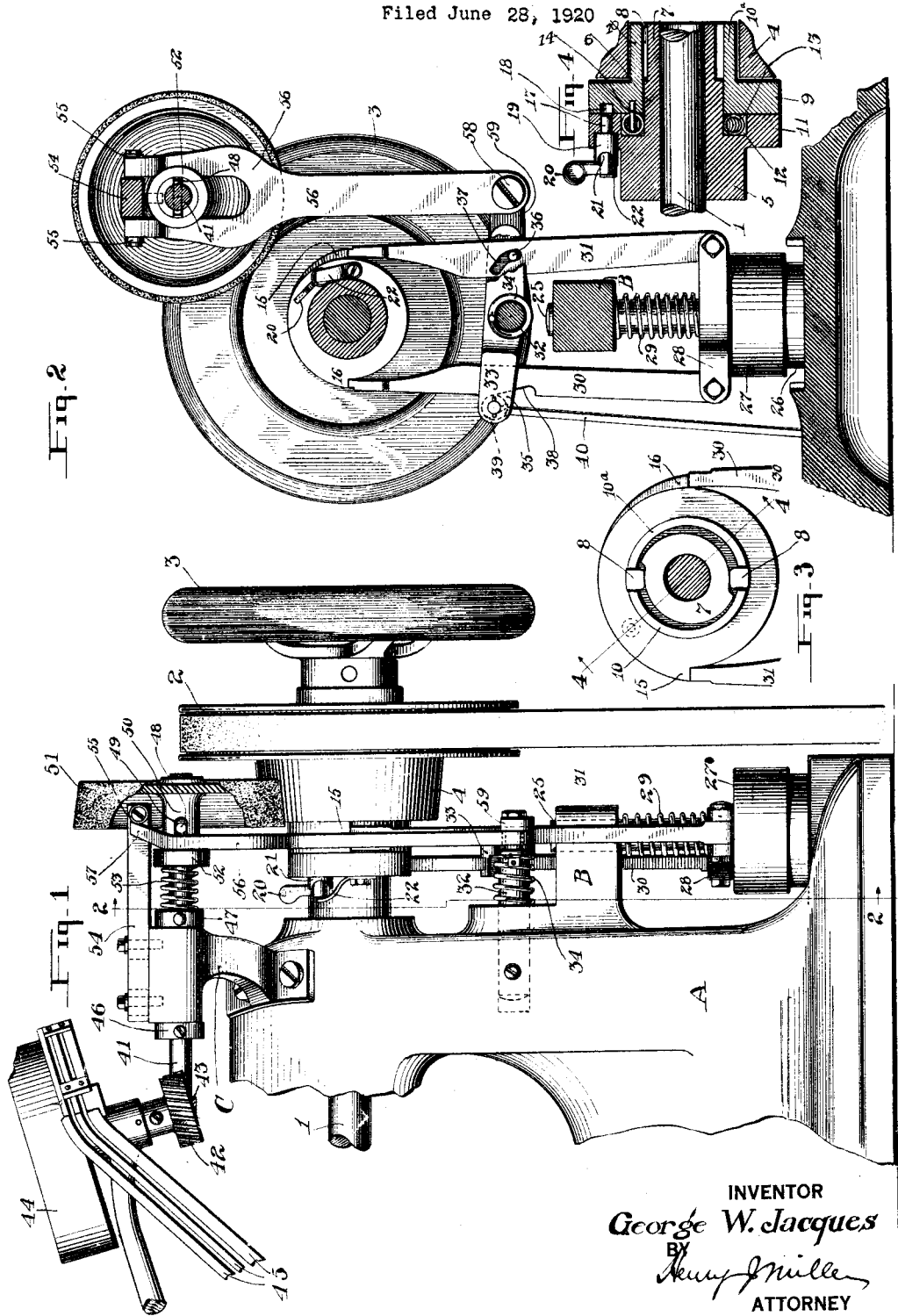

1,539,904

UNITED STATES PATENT OFFICE.

GEORGE W. JACQUES, OF STRATFORD, CONNECTICUT, ASSIGNOR, BY MESNE ASSIGNMENTS, TO UNITED SHOE MACHINERY CORPORATION, OF PATERSON, NEW JERSEY, A CORPORATION OF NEW JERSEY.

DRIVING MECHANISM.

Application filed June 28, 1920. Serial No. 392,260.

*To all whom it may concern:*

Be it known that I, GEORGE W. JACQUES, a citizen of the United States, residing at Stratford, in the county of Fairfield and State of Connecticut, have invented certain new and useful Improvements in Driving Mechanism, of which the following is a specification, reference being had therein to the accompanying drawings.

This invention relates to dual transmission of rotation in a mechanical organization in which it is sometimes desirable to start and stop two elements or mechanisms simultaneously, and at other times to start and stop one of them without starting the other.

A common example of such an organization is an eyeleting machine in which the eyelets are supplied to a raceway automatically by a hopper. In such a machine it is usually sufficient to feed eyelets from the hopper to the raceway when the eyelet-setting mechanism is in operation, but under some conditions, as when initially charging the raceway, and when for one reason or another the supply in the raceway becomes partly or wholly depleted, it is desirable to operate the eyelet-feeding device or mechanism without operating the setting mechanism. Accordingly an object of the invention is to provide improved means for controlling the transmission of rotation to two elements or mechanisms of an organization, for example, the eyelet-feeding device or mechanism and the setting mechanism of an eyeleting machine, so that both may be started and stopped together when desired, and one of them may be started and stopped independently of the other when desired.

Features of the invention consist in a novel organization in which two disconnectible transmission means and their respective controlling mechanisms are under the control of a single actuator such as a treadle, and in which an independent lock or detent is provided to prevent one of the controlling mechanisms temporarily from being responsive to the control of the actuating member. The invention is herein illustrated as embodied in an eyeleting machine of the type referred to, although in various aspects the invention is not limited to application to such machines. As shown in the drawings, the organization is such that under certain conditions the mere act of depressing a treadle-rod trips the clutch that transmits rotation to the eyelet-setting mechanism and simultaneously establishes coupled relation between a driving element and means for transmitting rotation from the latter to the eyelet-feeding device, while the mere act of releasing the treadle-rod effects disconnection of the setting mechanism and the eyelet-feeding device from their source or sources of power. The independent lock or detent, as a part of the illustrated organization, is usable at will to maintain the aforesaid clutch in uncoupled condition when it is desired merely to operate the eyelet-feeding device. This provides for effecting single or dual transmission by a single treadle arranged to be operated in the same manner for both purposes, the locking device being effective merely to take control of the clutch temporarily and to restore the clutch to the dual control of the treadle whenever desired.

Fig. 1 is a fragmentary front elevation of an eyeleting machine provided with a preferred embodiment of the invention.

Fig. 2, is a vertical cross section on line 2—2 of Fig. 1.

Fig. 3, is a detail end elevation of a portion of the stop mechanism, the driving pulleys being removed and the shaft shown in cross section, and, Fig. 4, is a longitudinal cross section on line 4—4 of Fig. 3 through the clutch portion of the stop motion.

A represents a portion of the machine frame having journaled in the upper portion thereof the mechanism actuating shaft 1 on which is journaled a drive pulley 2, and to which is made fast a handwheel 3, the drive pulley 2 having an annular flange 4 the external surface of which is conical and the inner surface of which is engageable by the clutch elements of a stop motion. As shown, this stop motion is constructed as follows: Referring to Figs. 3 and 4, a sleeve 5 is made fast to the shaft 1, this sleeve having a reduced portion 6 terminating in a portion 7, provided with cam faces on which may ride clutch blocks 8, the portion 7, together with the clutch blocks, extending within the conical flange 4. Journaled on the reduced portion 6 is a disc 9 having a pair of substantially semi-circular flanges 10 and 10ª spaced apart to receive the clutch blocks 8 between them. The sleeve 5 has an outwardly extending flange 11 against which one face of the disc 9 may bear, and is also provided with an annular recess 12 for the reception of a coiled spring 13 which bears at one end against a pin 14 fixed in the disc 9 and at its other end against a similar pin (not shown) in the sleeve 5, this spring tending to turn the disc 9 to such angular position relatively to the cam portions 7 as to cause the blocks 8 to clutch the inside of the flange 4. To disconnect the clutch the disc 9 is provided with a stop shoulder 15, and the flange 11 has a similar stop shoulder 16. When the parts 9 and 11 are in the angular relation shown a locking pin 17 slidable in a perforation in the portion 11 may be projected into a mating perforation 18 in the disc 9 to lock the clutch in its uncoupled condition. A sleeve 19 through which the pin 17 passes is formed on its outer end with depressions to receive a handle 20 fast to the pin 17, one of these depressions, for example, that indicated at 21, being of sufficient depth to allow pin 17 to enter the perforation 18, while another such depression but of less depth will serve to retain the pin 17 entirely within the portion 11. A leaf spring 22 fixed to the portion 11 and bearing on the outer end of the pin 17 holds the pin 17 projected toward the member 9 as far as the handle 20 riding in the depressions of the sleeve 19 will permit.

Slidably mounted in a boss B of the frame A is a guide rod 25. Surrounding the rod 25, and seated on the base of the machine is a spring or cushion 26 having a cap plate 27 bearing on the upper surface thereof. Seated on the plate 27 is a yoke 28 through which the rod 25 also passes, and bearing against the top of yoke 28 and the underside of the bracket B is a coil compression spring 29, spring 29 and cushion 26 cushioning the movement of yoke 28 in both directions. Pivoted to the opposite ends of the yoke 28 are stop arms 30 and 31, these arms projecting upwardly in the planes of rotation of the stop shoulders 16 and 15 respectively. Above the boss B a pin 32 is fixed to the frame A, and on its outer end is pivoted a rock lever 33. A torsion spring 34 surrounding the pin 32 normally presses the rear or left end 35 of the lever 33 upwardly (Fig. 2). A pin 36 carried by lever 33 engages a slot 37 in the stop arm 31, the lower portion of this slot being an arc and concentric to the axis of the pin 32, while the upper portion of this slot is inclined to have the effect of a cam. By this means a downward movement of the end 35 initially imparts no motion to the arm 31 but finally swings the arm out of contact with the stop shoulder 15. The arm 30 has a cam portion 38 cut on its rear face for engagement with a roll 39 carried by the arm 33, and a rod 40 pivoted thereto by means of the supporting pin of roll 39 projects downwardly and may be actuated up and down by the operator by any suitable means such as a treadle (not shown).

Journaled in a bracket C near the top of the machine is a drive shaft 41 connected by gears 42 and 43 to drive the feeding element of a hopper 44 which in this instance is designed to supply eyelets. Raceways 45 are provided for conducting the eyelets downwardly to the setting mechanism. Shaft 41 is held against endwise motion by collars 46 and 47 fast thereto, and near its outer end it carries a pin 48 riding in a slot 49 in the hub 50 of a conical friction wheel 51, arranged to engage and disengage the conical outer surface of the hub 4. A collar 52 is made fast to the inner end of the hub 50, and a spring 53 surrounding the shaft 41 and bearing against the collars 47 and 52 normally urges the friction wheel 51 into driving engagement with the hub 4. Fixed to the upper portion of bracket C is a bar 54 carrying at its outer end a pair of rolls 55 which engage twin cam portions 57 of a rod 56. This rod acts against the collar 52 to prevent the spring 53 from pressing the wheel 51 against the flange 4 of the pulley, and is forked as shown in Fig. 2, to straddle the hub 50 and bar 54. The lower end of rod 56 is pivoted at 58 to an arm 59 made fast to the lever 33.

The operation of this mechanism is as follows:

When the clutch and transmission train are uncoupled the parts occupy the position shown in the drawings, the rear end of the lever 33 being in its upper position, the roll 39 engaging the stop arm 30 and holding its upper end beneath the stop shoulder 16, while the pin 36 within the slot 37 holds the stop arm 31 in engagement with the stop shoulder 15. As above described, in this position the clutch blocks are out of contact with the inner surface of the flange 4, hence the shaft 1 is in unclutched condition. At the same time the rod 56 is in its depressed position, where it maintains the friction wheel 51 out of contact with the hub 4. The pulley 2 may therefore rotate without driving any of the mechanism.

When it is desired to drive the machine the operator depresses the rod 40 whereupon the pin 36 riding within the slot 37 moves the stop arm 31 out from beneath the shoulder 15 to permit the spring 13 to apply the clutch for the shaft 1. As the lever 33 is rocked to start the shaft 1, the rod 56 is pushed upwardly allowing the spring 53 to force the friction wheel 51 into driving engagement with the flange 4. In this position of the parts both the mechanism actuating shaft 1 and the article feeding mechanism 44 are coupled to the pulley 2.

When it is desired to stop the machine, rod 40 is allowed to rise under the action of the torsion spring 34, this action serving to depress the rod 56 and retract the friction wheel 51 from the flange 4. It also brings the stop arm 31 into the path of motion of the stop shoulder 15, which is thereupon caught and held from rotation. The momentum of the shaft 1 and parts actuated thereby continues the rotation of the sleeve 5, thus releasing the clutch, compressing the spring 13 and carrying the shoulder 16 past the end of the stop arm 30. The last portion of the motion of the lever 33, wherein the pin 36 rides in the concentric portion of the slot 37, imparts no motion to the arm 31, but serves to force the arm 30 against the flange 11 beneath the lug 16. When the momentum of the machine has been spent, the spring 13 reacts to impart a reverse rotation to flange 11, whereupon the shoulder 16 is brought into contact with the arm 30 by which it is arrested to retain the clutch blocks 8 in unclutched position with relation to the flange 4. During the stopping the spring and cushion members 29 and 26 serve to cushion the thrusts imparted to the arms 30 and 31.

When it is desired to actuate the article feed mechanism alone, as for example when the raceways for any reason become empty, this may be done without starting the machine, which if started would take such articles from the raceways and waste them. The operator moves the handle 20 to the depression 21 whereupon the spring 22 forces the locking pin 17 into engagement with the flanges, thus locking the clutching elements in unclutched relation as shown by Fig. 3. If the operator now depresses the rod 40 it will rock the lever 33 and displace the arm 31 from the stop shoulder 15 as before, but the spring 13 is now prevented by the pin 17 from applying the clutch 1 so this action of arm 31 is merely an idle motion. It should be noted that at this time the shaft is free to be turned by means of the handwheel 3. The rod 56, however, is raised as before, allowing the spring 53 to move the friction wheel 51 into driving engagement with the hub 4, whereupon the transmission means for the feed mechanism is set in operation. On allowing the rod 40 to rise again, rod 56 is depressed and the friction wheel 51 is removed from driving engagement with the flange 4, and the arm 31 is again moved in under the stop shoulder 15 the parts being then in stopped position. By turning the handle 20 to retract the locking pin 17 the clutch for the shaft 1 will be restored to the control of the rod 40.

Having thus described one embodiment of this invention, though it should be understood that this is in no way limited to eyeleting machines, but might be applied to any machine having article feeding and utilizing functions, what is claimed is:

1. In combination, a mechanism actuating shaft, a source of power, an article feeding mechanism, operating means to establish and interrupt driving relation between said source of power and said mechanism, coupling means connected with said operating means and adapted to establish and interrupt driving relation between said source of power and said shaft, and means for rendering said coupling means ineffective to establish said driving relation while permitting said operating means to set said mechanism in operation.

2. In combination, a mechanism actuating shaft, a source of power, an article feeding mechanism, controlling means for establishing and interrupting driving relation between the source of power and said shaft and between the source of power and said mechanism, and means for rendering said controlling means ineffective relative to control of said shaft while maintaining its effectiveness relative to control of said feeding mechanism.

3. In combination, a mechanism actuating shaft, a source of power, a stop motion interposed between said shaft and source, a mechanism operable independently of said shaft, means operable by said stop motion to couple and uncouple said mechanism and said source, and means for rendering said stop motion ineffective with respect to said shaft while it continues effective with respect to said coupling and uncoupling means.

4. In combination, a mechanism-actuating shaft, a pulley journaled thereon, a clutch arranged to couple and uncouple said shaft and pulley, an article-feeding mechanism, transmission means arranged to couple and uncouple said pulley and said article-feeding mechanism, and controlling means common to both said clutch and said transmission means.

5. In combination, a mechanism-actuating shaft, an article-feeding mechanism, a driving pulley, two separate transmission means, one to couple and uncouple said shaft and pulley and the other to couple and uncouple said pulley and article-feeding mechanism, controlling means common to both of said transmission means for rendering them effective simultaneously, and means usable at will to lock one of said transmission means in its uncoupled relation so that the other alone may respond to said controlling means.

6. In combination, a machine-actuating shaft, an article-feeding mechanism, a driving pulley, means tending to couple said shaft and pulley, means tending to couple said pulley and said mechanism, controlling means arranged normally to maintain both of said coupling means in uncoupling condition but operable to release them both, and means for preventing one of said coupling means from responding to the releasing action of said controlling means while the other one of said coupling means is responding thereto.

7. In combination, a mechanism-actuating shaft, an article-feeding mechanism, a driving pulley, two separate means arranged to couple and uncouple said pulley with said shaft and article-feeding mechanism, a manually movable member, means operable by said member for controlling said coupling means, and means for preventing one of said coupling means from functioning when it is desired to use said manually movable member to cause the other coupling means alone to function.

8. In combination, a mechanism actuating shaft, a pulley journaled on said shaft, means tending to clutch said pulley and shaft, an article feeding mechanism, actuating means for said mechanism, means tending to clutch said actuating means to said pulley, and common means for unclutching both shaft and actuating means from said pulley.

9. In combination, a mechanism actuating shaft, a drive pulley journaled on said shaft and having a drive face, an article feed mechanism, a drive shaft for said mechanism, a pulley slidably keyed to said drive shaft and movable into and out of driving engagement with the driving face of said drive pulley, means tending to hold said pulleys in driving engagement, wedge means for forcing said pulleys out of driving engagement, a clutch between said drive pulley and mechanism actuating shaft, and means for simultaneously unclutching said mechanism actuating shaft, and actuating said wedge means to force said pulleys out of driving engagement.

10. In combination, a mechanism actuating shaft, a drive pulley journaled on said shaft and having a drive face, an article feed mechanism, a drive shaft for said mechanism, a pulley slidably keyed to said drive shaft and movable into and out of driving engagement with the driving face of said drive pulley, means tending to hold said pulleys in driving engagement, wedge means for forcing said pulleys out of driving engagement, a clutch between said drive pulley and mechanism actuating shaft, and means for locking said mechanism actuating shaft in unclutched condition.

11. In combination, a mechanism actuating shaft, a drive pulley journaled on said shaft and having a drive face, an article feed mechanism, a drive shaft for said mechanism, a pulley slidably keyed to said drive shaft and movable into and out of driving engagement with the driving face of said drive pulley, means tending to hold said pulleys in driving engagement, wedge means for forcing said pulleys out of driving engagement, a clutch between said drive pulley and mechanism actuating shaft, and means for locking said mechanism actuating shaft in unclutched condition while allowing said pulleys to move into and out of driving engagement at the will of the operator.

In testimony whereof, I have signed my name to this specification.

GEORGE W. JACQUES.